United States Patent
Childress et al.

(10) Patent No.: US 10,428,806 B2
(45) Date of Patent: Oct. 1, 2019

(54) STRUCTURAL PROPELLANT FOR ION ROCKETS (SPIR)

(71) Applicant: THE BOEING COMPANY, Chicago, IL (US)

(72) Inventors: Jamie J. Childress, Chicago, IL (US); Thomas L. Kessler, Chicago, IL (US)

(73) Assignee: The Boeing Company, Chicago, IL (US)

( * ) Notice: Subject to any disclaimer, the term of this patent is extended or adjusted under 35 U.S.C. 154(b) by 708 days.

(21) Appl. No.: 15/004,818

(22) Filed: Jan. 22, 2016

(65) Prior Publication Data

US 2017/0211554 A1    Jul. 27, 2017

(51) Int. Cl.
| | |
|---|---|
| *F03H 1/00* | (2006.01) |
| *B64G 1/40* | (2006.01) |
| *B64G 4/00* | (2006.01) |
| *B64G 1/00* | (2006.01) |

(52) U.S. Cl.
CPC ........... *F03H 1/0012* (2013.01); *B64G 1/402* (2013.01); *B64G 1/403* (2013.01); *B64G 1/405* (2013.01); *B64G 4/00* (2013.01); *F03H 1/0037* (2013.01); *F03H 1/0075* (2013.01); *B64G 1/007* (2013.01)

(58) Field of Classification Search
CPC .... F03H 1/0012; F03H 1/0062; F03H 1/0068; F03H 1/0075; B64G 1/405; B64G 1/402
See application file for complete search history.

(56) References Cited

U.S. PATENT DOCUMENTS

| | | | |
|---|---|---|---|
| 6,609,363 B1 | 8/2003 | Dressler et al. | |
| 9,334,855 B1* | 5/2016 | Hruby | F03H 1/0075 |
| 2005/0086926 A1 | 4/2005 | King | |
| 2006/0207981 A1* | 9/2006 | Diekmann | B23K 9/1336 |
| | | | 219/137.2 |
| 2013/0067883 A1* | 3/2013 | Emsellem | F03H 1/0081 |
| | | | 60/202 |
| 2015/0021439 A1 | 1/2015 | Duchemin et al. | |
| 2016/0001898 A1* | 1/2016 | Duchemin | B64G 1/007 |
| | | | 60/224 |

* cited by examiner

*Primary Examiner* — Gerald L Sung
*Assistant Examiner* — William L Breazeal
(74) *Attorney, Agent, or Firm* — Haynes & Boone LLP

(57) ABSTRACT

Systems, methods, and apparatus for a structural propellant for ion rockets (SPIR) are disclosed. In one or more embodiments, a method for in-space propulsion of a spacecraft involves removing, by a removal device, a portion of a structure of the spacecraft. The method further involves feeding, by the removal device, the portion into a Hall thruster system. Further, the method involves utilizing, by the Hall thruster system, the portion as propellant to produce thrust. In one or more embodiments, the structure is an upper stage of the spacecraft. In at least one embodiment, the upper stage comprises at least one structural support and/or at least one upper stage housing. In some embodiments, the structure is manufactured from magnesium, bismuth, zinc, and/or indium.

20 Claims, 5 Drawing Sheets

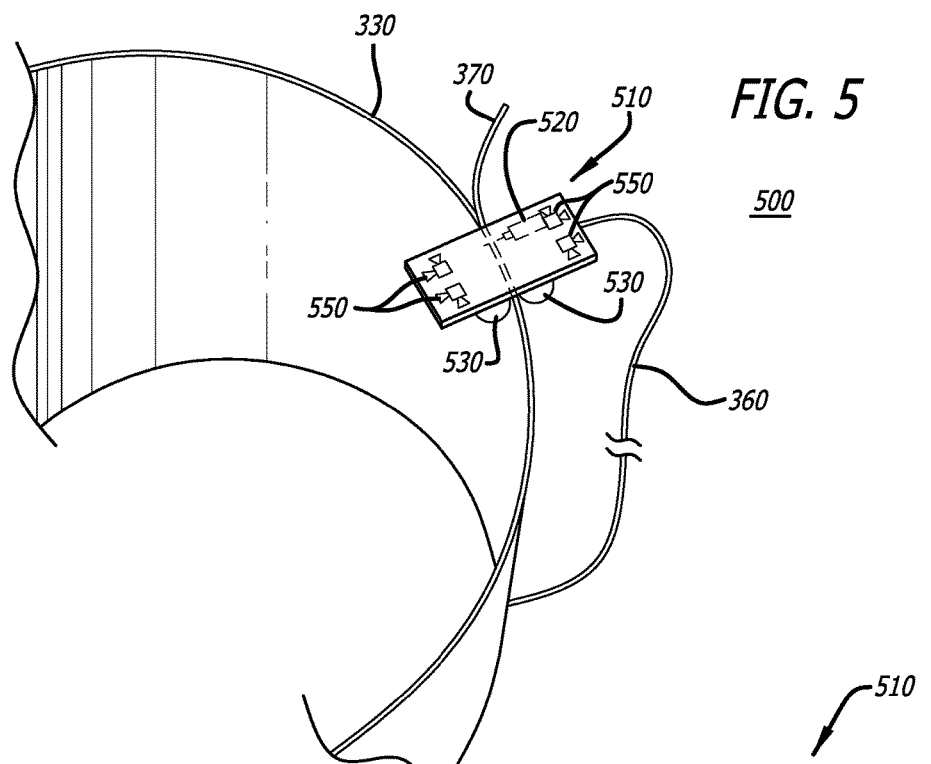
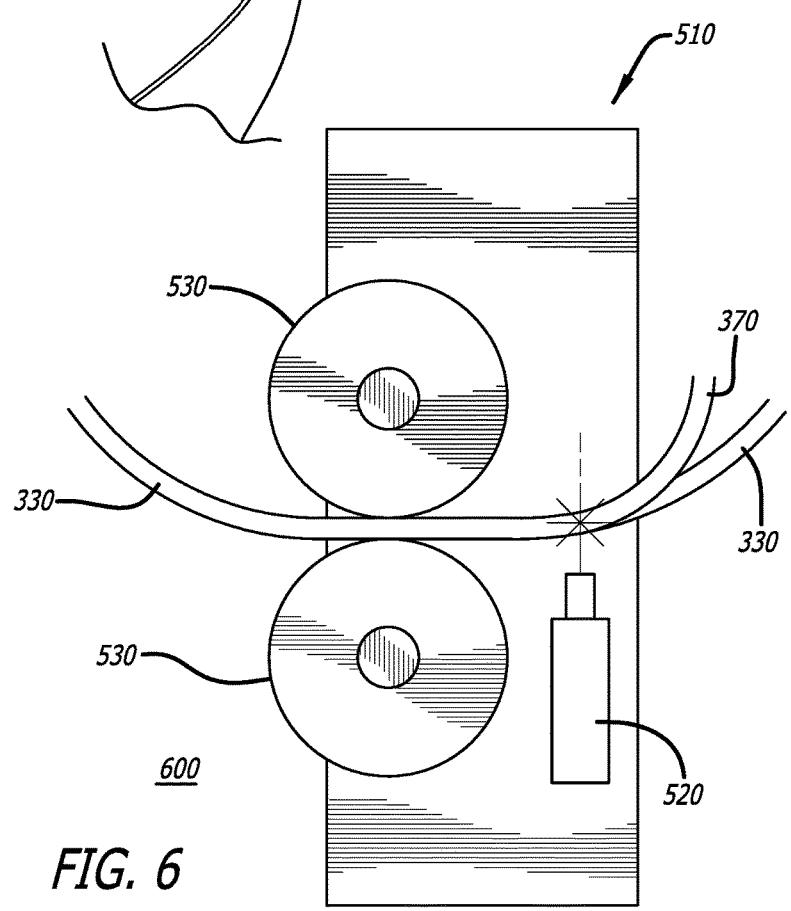

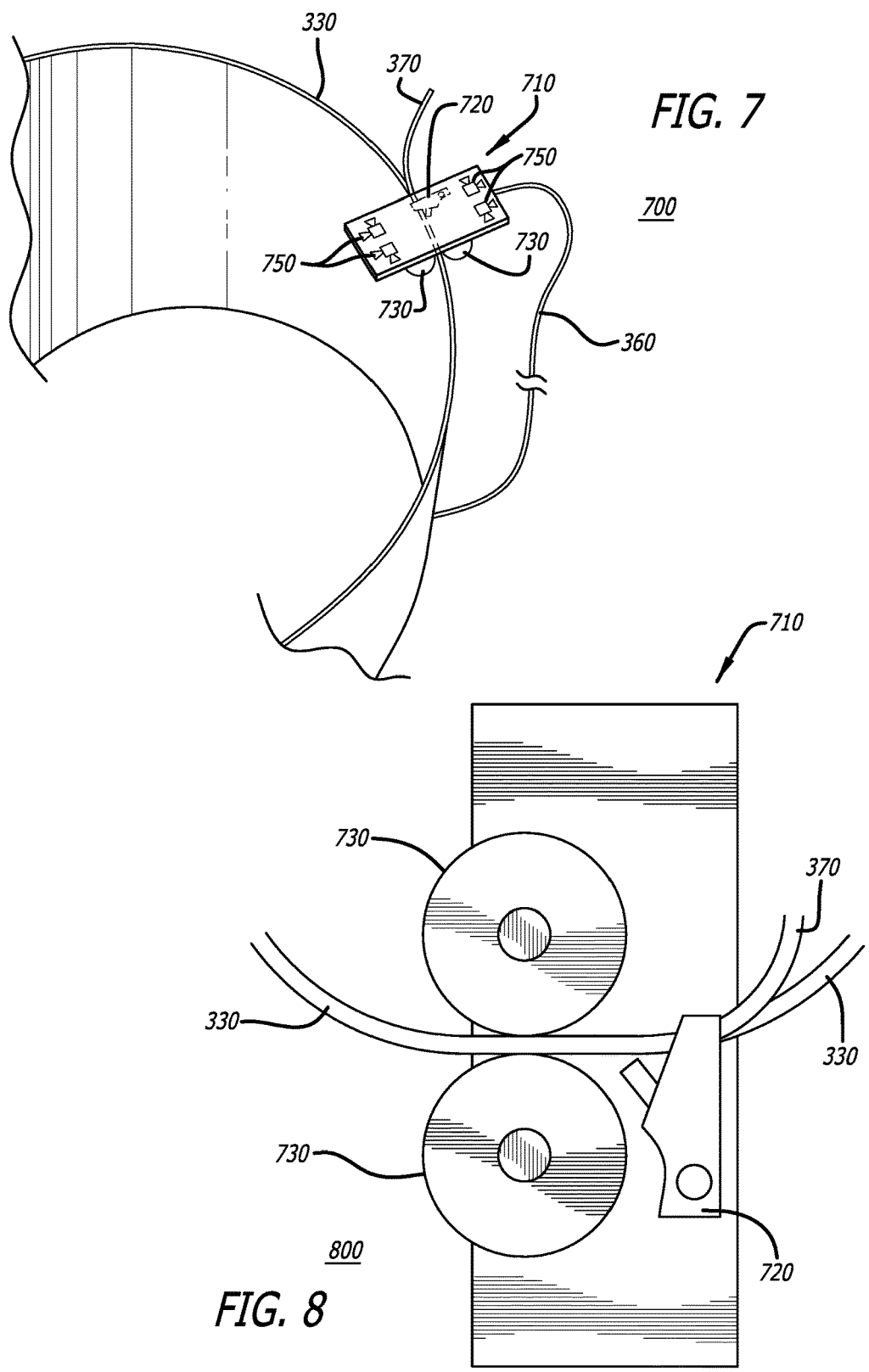

STRUCTURAL PROPELLANT FOR ION ROCKETS (SPIR)

FIELD

The present disclosure relates to a structural propellant. In particular, it relates to a structural propellant for ion rockets (SPIR).

BACKGROUND

Spacecraft, such as satellites, require in-space propulsion systems for orbital station-keeping as well as for other on-orbit maneuvers. Hall thrusters are often employed on spacecraft to provide high specific impulse propulsion in-space. Hall thrusters require an inert propellant mass for expulsion. Currently, in conventional Hall thruster designs, Hall thruster propellant is stored in a propellant bottle. The disadvantage of these conventional designs is that the propellant and the propellant bottle represent significant mass on the spacecraft, and spacecraft launch costs are directly related to spacecraft mass. As such, these conventional designs for Hall thrusters, which require significant mass, contribute greatly to spacecraft launch costs. Therefore, there is a need for a solution for a lower mass Hall thruster design for spacecrafts.

SUMMARY

The present disclosure relates to a method, system, and apparatus for a structural propellant for ion rockets (SPIR). In one or more embodiments, a method for in-space propulsion of a spacecraft involves removing, by a removal device, a portion of a structure of the spacecraft. The method further involves feeding, by the removal device, the portion into a Hall thruster system. Further, the method involves utilizing, by the Hall thruster system, the portion as propellant to produce thrust.

In one or more embodiments, the removal device comprises at least one mechanical cutter and/or at least one laser cutter. In some embodiments, at least one mechanical cutter comprises at least one cutting wheel and/or at least one scissors mechanism.

In at least one embodiment, the structure is an upper stage of the spacecraft. In some embodiments, the upper stage comprises at least one structural support and/or at least one upper stage housing. In one or more embodiments, the structure is manufactured from magnesium, bismuth, zinc, and/or indium.

In one or more embodiments, the portion of the structure is removed by the removal device in the form of a ribbon. In at least one embodiment, the removal device is tethered to the spacecraft via at least one cord. In some embodiments, the removal device is a robotic device that moves about the spacecraft. In one or more embodiments, the removal device comprises at least one wheel and/or at least one thruster.

In at least one embodiment, a system for in-space propulsion of a spacecraft involves a removal device to remove a portion of a structure of the spacecraft, and to feed the portion into a Hall thruster system. The system further involves the Hall thruster system to utilize the portion as propellant to produce thrust.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 5 is a diagram depicting the disclosed system for in-space propulsion of a spacecraft showing a top view of a removal device, which employs a laser, removing a portion of a structure of a spacecraft, in accordance with at least one embodiment of the present disclosure.

FIG. 6 is a diagram showing a side view of the removal device of FIG. 5, in accordance with at least one embodiment of the present disclosure.

FIG. 7 is a diagram illustrating the disclosed system for in-space propulsion of a spacecraft showing a top view of a removal device, which employs a scissors mechanism, removing a portion of a structure of a spacecraft, in accordance with at least one embodiment of the present disclosure.

FIG. 8 is a diagram showing a side view of the removal device of FIG. 7, in accordance with at least one embodiment of the present disclosure.

DESCRIPTION

Figure 1:
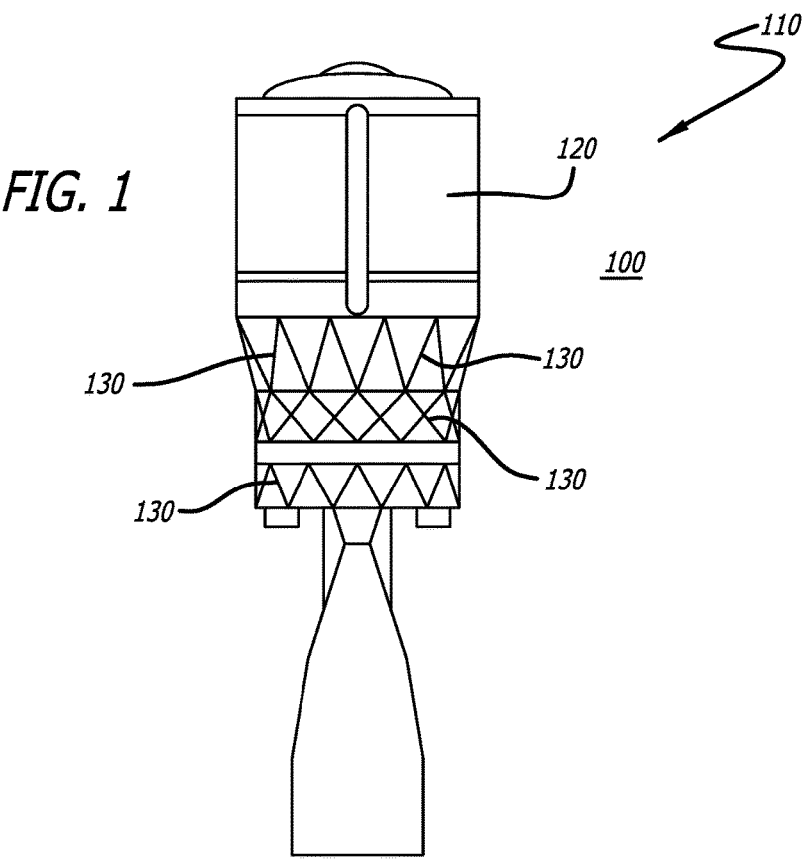
FIG. 1 is a diagram depicting an exemplary upper stage of a spacecraft that may be employed by the disclosed system for in-space propulsion of a spacecraft, in accordance with at least one embodiment of the present disclosure.

The methods and apparatus disclosed herein provide an operative system for a structural propellant for ion rockets (SPIR). The system of the present disclosure provides a SPIR approach that utilizes excess spacecraft structure for fuel. In particular, the system provides a spacecraft comprising a specific structure that may be re-purposed for use as propellant mass for an on-board thruster. The specific structure to be re-purposed as fuel would be manufactured from magnesium, which would become the propellant mass for an ion thruster (e.g., a Hall thruster). For example, the upper stage structure of the spacecraft, which would be manufactured from magnesium, would be consumed as propellant by an on-board Hall thruster system.

Typically, spacecraft launch loads greatly exceed in-space loads for most spacecraft. This results in excess structure on the spacecraft. This excess structure not only has no function on-orbit, but it further reduces the delta-v capability of the spacecraft's limited fuel, due to the increase in mass of the spacecraft. Using the unneeded structure for in-space propellant mass increases the available mass for the spacecraft payload.

The system of the present disclosure provides propellant mass by consuming unneeded parts of the spacecraft structure. The disclosed system replaces existing spacecraft structure that is only required to meet launch loads, with a structure that may be eventually used for fuel. This configuration design both increases the available fuel supply and optimizes the total spacecraft mass usage.

It should be noted that Hall thrusters have been built that use magnesium as the propellant. However, for these systems, the magnesium propellant is not "scavenged" from an unneeded structure, as is performed by the system of the present disclosure.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to Hall thruster systems, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIG. 1 is a diagram 100 depicting an exemplary upper stage 110 of a spacecraft that may be employed by the disclosed system for in-space propulsion of a spacecraft, in accordance with at least one embodiment of the present disclosure. In this figure, the upper stage 110 shown is a Delta IV $2^{nd}$ stage. It should be noted that, in one or more embodiments, different upper stages, manufactured by different manufacturers, than the upper stage 110 shown in FIG. 1 may be employed by the disclosed system for in-space propulsion of a spacecraft.

Also in this figure, the upper stage 110 is shown to comprise an upper stage housing 120, which is cylindrical in shape. In addition, the upper stage 110 is shown to include a plurality of structural supports 130, which are in a lattice configuration.

Figure 2:
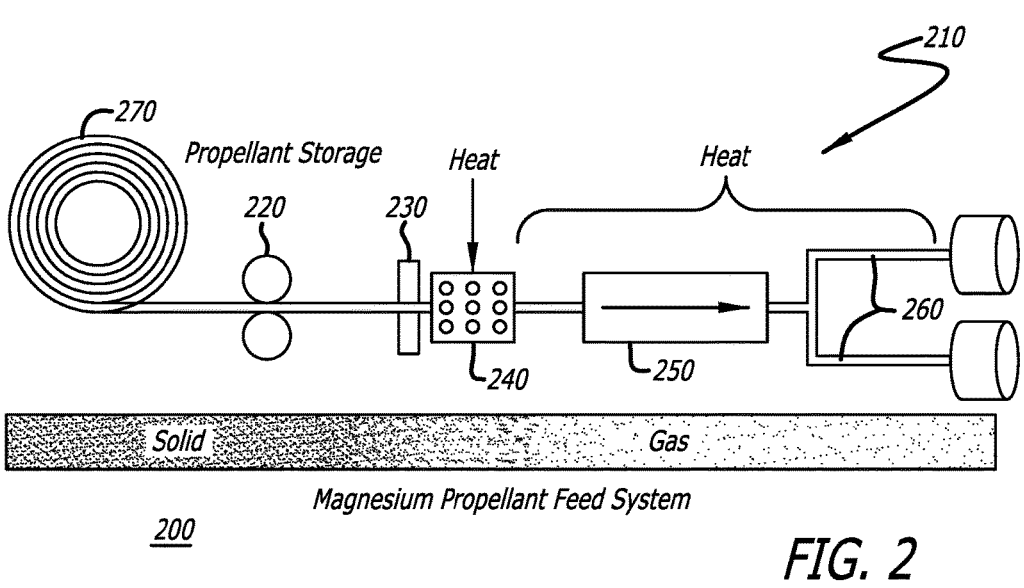
FIG. 2 is a diagram showing a Hall thruster system that may be employed by the disclosed system for in-space propulsion of a spacecraft, in accordance with at least one embodiment of the present disclosure.

FIG. 2 is a diagram 200 showing a Hall thruster system 210 that may be employed by the disclosed system for in-space propulsion of a spacecraft, in accordance with at least one embodiment of the present disclosure. In this figure the Hall thruster system 210 is shown to comprise a ribbon conveyor 220, a gas seal 230, a vaporizer 240, an isolator 250, and Hall thrusters 260.

During operation of the Hall thruster system 210, a solid ribbon 270 of propellant is fed into the ribbon conveyor 220. In this example, magnesium ribbon is the type of solid ribbon 270 that is being utilized by the Hall thruster system 210. However, it should be noted that in other embodiments, other types of solid ribbon 270 other than magnesium ribbon may be used including, but not limited to, bismuth, zinc, and indium ribbon.

The ribbon conveyor 220 feeds the solid ribbon 270 into a gas seal 230. Then, a vaporizer 240 heats the solid ribbon 270 such that the solid ribbon 250 is converted into a gas. The gas seal 230 prevents the gas from leaking.

Then, an isolator 250 is used to control the flow of the gas to the Hall thrusters 260. The Hall thrusters 260 then use the gas as propellant to produce thrust.

Figure 3:
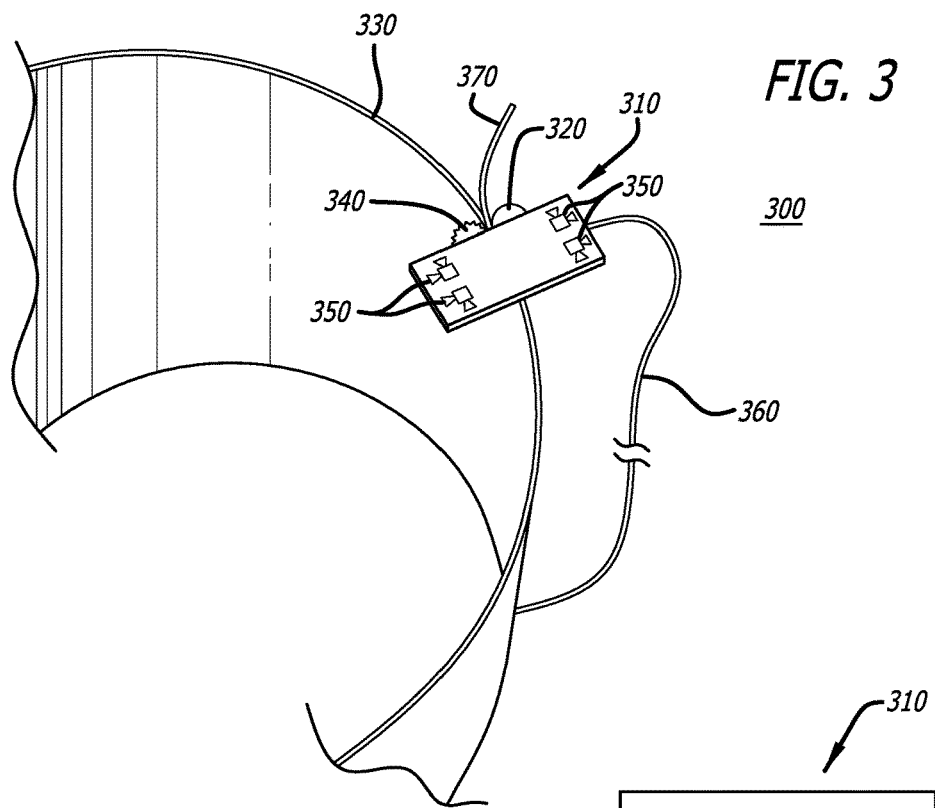
FIG. 3 is a diagram illustrating the disclosed system for in-space propulsion of a spacecraft showing a top view of a removal device, which employs a cutting wheel, removing a portion of a structure of a spacecraft, in accordance with at least one embodiment of the present disclosure.

FIG. 3 is a diagram 300 illustrating the disclosed system for in-space propulsion of a spacecraft showing a top view of a removal device 310, which employs a cutting wheel 320, removing a portion of a structure 330 of a spacecraft, in accordance with at least one embodiment of the present disclosure. In this figure, the removal device 310 employs a mechanical cutter, similar to a can opener design, that comprises a cutting wheel 320 and a serrated wheel 340. The removal device 310 is also shown to include a plurality of thrusters 350 and a cord 360.

During operation, after the spacecraft (not shown) has been boosted into final orbit, the removal device 310, which is a robotic device, will be used to "scavenge" material from the structure 330 to be used as solid propellant for a Hall thruster system located on the spacecraft. In this example, the structure 330 is an upper stage. As such, the removal device 310 may "scavenge" various parts of the upper stage including, but not limited to, an upper stage housing and structural supports of the upper stage. However, it should be noted that in other embodiments, the structure 330 may be a different structure from the spacecraft other than an upper stage.

Also, for this example, the structure 330 is manufactured from magnesium. Magnesium is structurally efficient, and is approximately thirty-four percent (34%) lighter in volume than aluminum. Magnesium has good fatigue resistance and vibration damping capacity. However, it should be noted that in other embodiments, the structure 330 may be manufactured from materials other than magnesium including, but not limited to, bismuth, zinc, and indium.

After the spacecraft has been boosted into final orbit, the removal device 310, which is tethered to the structure 330 (or to another location on the spacecraft) via the cord 360, crawls (or moves) about the structure 330 while removing (by use of the cutting wheel 320) at least a portion of the structure 330 in the form of a ribbon 370. The combination of the cutting wheel 320 and the serrated wheel 340 assist in guiding the removal device 310 across the edge of the structure 330 during the removal of a portion of the structure 330. The thrusters 350 on the removal device 310 assist the removal device 310 in moving about the structure 330. It should be noted that in other embodiments, the removal device 310 may comprise at least one wheel (and/or other similar types of conveyance devices, such as at least one roller ball) to assist itself in moving about the structure 330.

After the removal device 310 has removed the portion of the structure 330 in the form of a ribbon 370, the removal device 310 will feed the ribbon 370 into the Hall thruster system (not shown) located on the spacecraft (refer to FIG. 2, which shows a solid ribbon 270 being fed into a Hall thruster system 210). The Hall thruster system will use the ribbon 370 as propellant to produce thrust for the spacecraft to achieve various on-orbit maneuvers.

Figure 4:
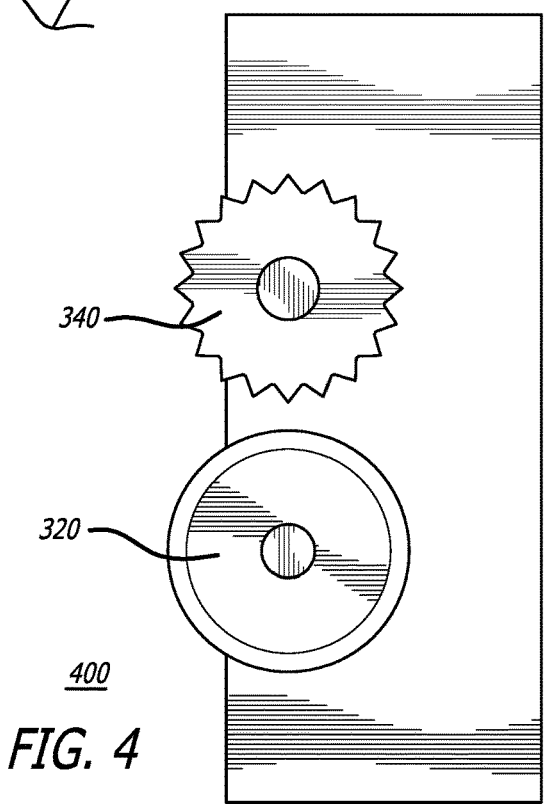
FIG. 4 is a diagram showing a side view of the removal device of FIG. 3, in accordance with at least one embodiment of the present disclosure.

FIG. 4 is a diagram 400 showing a side view of the removal device 310 of FIG. 3, in accordance with at least one embodiment of the present disclosure. In this figure, the removal device 310 is shown to comprise a cutting wheel 320 and a serrated wheel 340.

FIG. 5 is a diagram 500 depicting the disclosed system for in-space propulsion of a spacecraft showing a top view of a removal device 510, which employs a laser 520, removing a portion of a structure 330 of a spacecraft, in accordance with at least one embodiment of the present disclosure. In this figure, the removal device 510 employs a laser cutter, which comprises a laser 520. The removal device 310 is also shown to include a pair of guiding wheels 530, a plurality of thrusters 550, and a cord 360.

During operation, after the spacecraft (not shown) has been boosted into final orbit, the removal device 510, which is a robotic device, will be used to "scavenge" material from the structure 330 to be used as solid propellant for a Hall thruster system located on the spacecraft. After the spacecraft has been boosted into final orbit, the removal device 510, which is tethered to the structure 330 (or to another location on the spacecraft) via the cord 360, crawls (or moves) about the structure 330 while removing (by use of the laser 520) at least a portion of the structure 330 in the form of a ribbon 370. The guiding wheels 530 assist in guiding the removal device 510 across the edge of the structure 330 during the removal of a portion of the structure 330. The thrusters 550 on the removal device 510 assist the removal device 510 in moving about the structure 330. It should be noted that in other embodiments, the removal device 510 may comprise at least one wheel (and/or other similar types of conveyance devices, such as at least one roller ball) to assist itself in moving about the structure 330.

After the removal device 510 has removed the portion of the structure 330 in the form of a ribbon 370, the removal device 310 will feed the ribbon 370 into the Hall thruster system (not shown) located on the spacecraft (refer to FIG. 2, which shows a solid ribbon 270 being fed into a Hall thruster system 210). The Hall thruster system will use the ribbon 370 as propellant to produce thrust for the spacecraft to achieve various on-orbit maneuvers.

FIG. 6 is a diagram 600 showing a side view of the removal device 510 of FIG. 5, in accordance with at least one embodiment of the present disclosure. In this figure, the removal device 510 is shown to comprise a laser 520 and a pair of guiding wheels 530. The removal device 510 is shown to be removing (by use of the laser 520) at least a portion of the structure 330 in the form of a ribbon 370.

FIG. 7 is a diagram 700 illustrating the disclosed system for in-space propulsion of a spacecraft showing a top view of a removal device 710, which employs a scissors mechanism 720, removing a portion of a structure 330 of a spacecraft, in accordance with at least one embodiment of the present disclosure. In this figure, the removal device 710 employs a mechanical cutter, which comprises a scissors mechanism 720. The removal device 710 is also shown to include a pair of guiding wheels 730, a plurality of thrusters 750, and a cord 360.

During operation, after the spacecraft (not shown) has been boosted into final orbit, the removal device 710, which is a robotic device, will be used to "scavenge" material from the structure 330 to be used as solid propellant for a Hall thruster system located on the spacecraft. After the spacecraft has been boosted into final orbit, the removal device 710, which is tethered to the structure 330 (or to another location on the spacecraft) via the cord 360, crawls (or moves) about the structure 330 while removing (by use of the scissors mechanism 720) at least a portion of the structure 330 in the form of a ribbon 370. The guiding wheels 730 assist in guiding the removal device 710 across the edge of the structure 330 during the removal of a portion of the structure 330. The thrusters 750 on the removal device 710 assist the removal device 710 in moving about the structure 330. It should be noted that in other embodiments, the removal device 710 may comprise at least one wheel (and/or other similar types of conveyance devices, such as at least one roller ball) to assist itself in moving about the structure 330.

After the removal device 710 has removed the portion of the structure 330 in the form of a ribbon 370, the removal device 710 will feed the ribbon 370 into the Hall thruster system (not shown) located on the spacecraft (refer to FIG. 2, which shows a solid ribbon 270 being fed into a Hall thruster system 210). The Hall thruster system will use the ribbon 370 as propellant to produce thrust for the spacecraft to achieve various on-orbit maneuvers.

FIG. 8 is a diagram 800 showing a side view of the removal device 710 of FIG. 7, in accordance with at least one embodiment of the present disclosure. In this figure, the removal device 710 is shown to comprise a scissors mechanism 720 and a pair of guiding wheels 730. The removal device 710 is shown to be removing (by use of the scissors mechanism 720) at least a portion of the structure 330 in the form of a ribbon 370.

Figure 9:
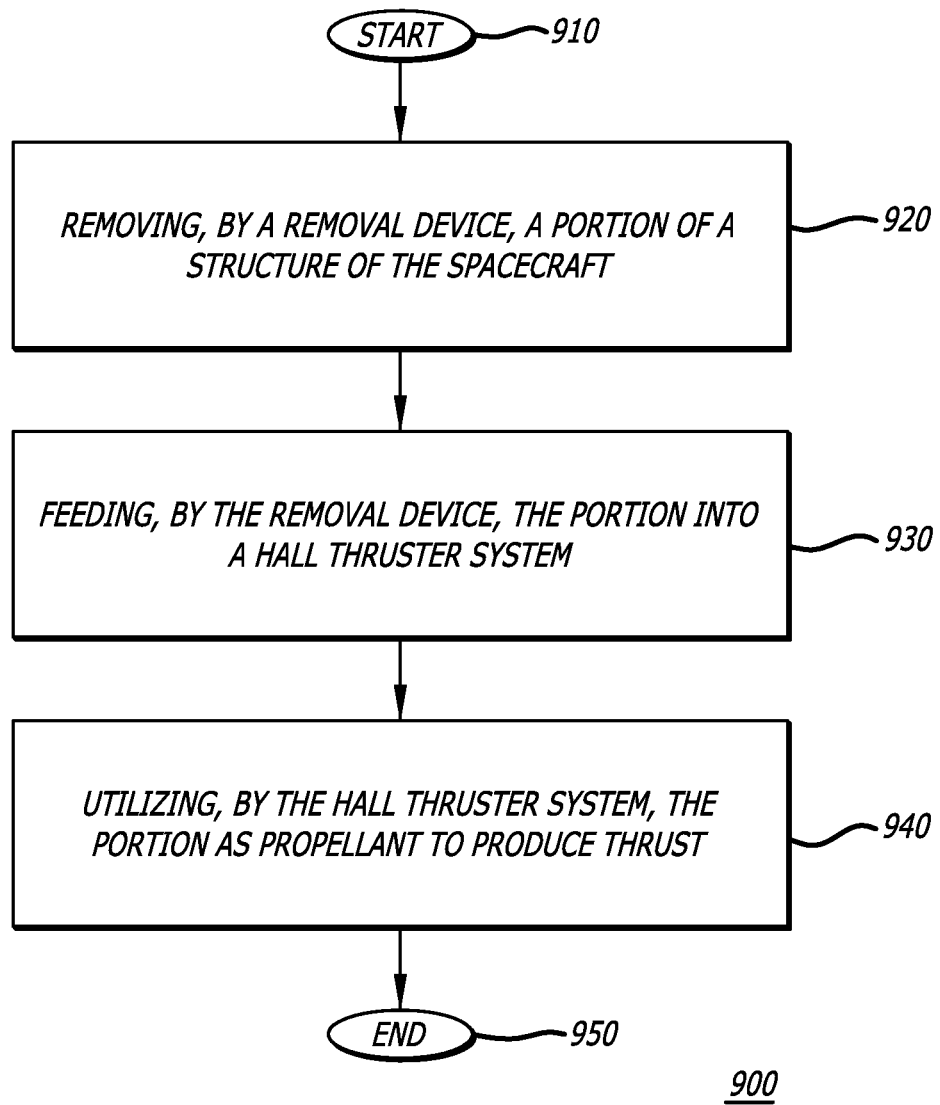
FIG. 9 is a flow chart depicting the disclosed method for in-space propulsion of a spacecraft, in accordance with at least one embodiment of the present disclosure.

FIG. 9 is a flow chart depicting the disclosed method 900 for in-space propulsion of a spacecraft, in accordance with at least one embodiment of the present disclosure. At the start 910 of the method 900, a removal device removes a portion of a structure of a spacecraft 920. Then, the removal device feeds the portion into a Hall thruster system 930. The Hall thruster system then utilizes the portion to produce thrust 940. Then, the method 900 ends 950.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Although particular embodiments have been shown and described, it should be understood that the above discussion is not intended to limit the scope of these embodiments. While embodiments and variations of the many aspects of the present disclosure have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less parts of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for in-space propulsion of a spacecraft, the method comprising:
   removing, by a removal device, a portion of a structure, which provides housing and/or structural support for the spacecraft, to re-purpose the portion of the structure as propellant;
   feeding, by the removal device, the portion into a Hall thruster system; and
   utilizing, by the Hall thruster system, the portion as propellant to produce thrust.

2. The method of claim 1, wherein the removal device comprises at least one of at least one mechanical cutter and at least one laser cutter.

3. The method of claim 2, wherein the at least one mechanical cutter comprises at least one of at least one cutting wheel and at least one scissors mechanism.

4. The method of claim 1, wherein the structure is an upper stage of the spacecraft.

5. The method of claim 4, wherein the structure comprises a structural support and/or an upper stage housing.

6. The method of claim 1, wherein the structure is manufactured from at least one of magnesium, bismuth, zinc, and indium.

7. The method of claim 1, wherein the portion of the structure is removed by the removal device in the form of a ribbon.

8. The method of claim 1, wherein the removal device is tethered to the spacecraft via at least one cord.

9. The method of claim 1, wherein the removal device is a robotic device that moves about the spacecraft.

10. The method of claim 1, wherein the removal device comprises at least one of at least one wheel and at least one thruster.

11. A system for in-space propulsion of a spacecraft, the system comprising:
    a removal device to remove a portion of a structure, which provides housing and/or structural support for the spacecraft, to re-purpose the portion of the structure as propellant, and to feed the portion into a Hall thruster system; and
    the Hall thruster system to utilize the portion as propellant to produce thrust.

12. The system of claim 11, wherein the removal device comprises at least one of at least one mechanical cutter and at least one laser cutter.

13. The system of claim 12, wherein the at least one mechanical cutter comprises at least one of at least one cutting wheel and at least one scissors mechanism.

14. The system of claim 11, wherein the structure is an upper stage of the spacecraft.

15. The system of claim 14, wherein the structure comprises a structural support and/or an upper stage housing.

16. The system of claim 11, wherein the structure is manufactured from at least one of magnesium, bismuth, zinc, and indium.

17. The system of claim 11, wherein the portion of the structure is removed by the removal device in the form of a ribbon.

18. The system of claim 11, wherein the removal device is tethered to the spacecraft via at least one cord.

19. The system of claim 11, wherein the removal device is a robotic device that moves about the spacecraft.

20. The system of claim 11, wherein the removal device comprises at least one of at least one wheel and at least one thruster.

* * * * *